(12) United States Patent
Aleem et al.

(10) Patent No.: US 10,409,057 B2
(45) Date of Patent: *Sep. 10, 2019

(54) SYSTEMS, DEVICES, AND METHODS FOR LASER EYE TRACKING IN WEARABLE HEADS-UP DISPLAYS

(71) Applicant: North Inc., Kitchener (CA)

(72) Inventors: Idris S. Aleem, Pickering (CA); Mayank Bhargava, Waterloo (CA)

(73) Assignee: NORTH INC., Kitchener, ON (CA)

( * ) Notice: Subject to any disclaimer, the term of this patent is extended or adjusted under 35 U.S.C. 154(b) by 12 days.

This patent is subject to a terminal disclaimer.

(21) Appl. No.: 15/827,667

(22) Filed: Nov. 30, 2017

(65) Prior Publication Data

US 2018/0149863 A1 May 31, 2018

Related U.S. Application Data

(60) Provisional application No. 62/428,320, filed on Nov. 30, 2016.

(51) Int. Cl.
*G02B 27/01* (2006.01)
*G06F 3/01* (2006.01)
(Continued)

(52) U.S. Cl.
CPC ........... *G02B 27/0093* (2013.01); *G02B 5/32* (2013.01); *G02B 26/101* (2013.01);
(Continued)

(58) Field of Classification Search
CPC .............. G02B 27/0172; G02B 27/014; G02B 27/017; G02B 27/0176; G02B 27/0179;
(Continued)

(56) References Cited

U.S. PATENT DOCUMENTS 3,408,133 A 10/1968 Lee
3,712,716 A 1/1973 Cornsweet et al.
(Continued)

FOREIGN PATENT DOCUMENTS

JP 61-198892 A 9/1986
JP 10-319240 A 12/1998
(Continued)

OTHER PUBLICATIONS

Amitai, "P-27: A Two-dimensional Aperture Expander for Ultra-Compact, High-Performance Head-Worn Displays," *SID Symposium Digest of Technical Papers*, vol. 36, No. 1 (2005), pp. 360-363.
(Continued)

*Primary Examiner* — Dismery Mercedes
(74) *Attorney, Agent, or Firm* — Thomas Mahon

(57) ABSTRACT

Systems, devices, and methods that use elements of a scanning laser projector ("SLP") to determine the gaze direction of a user of a wearable heads-up display ("WHUD") are described. An infrared laser diode is added to an RGB SLP and an infrared photodetector is aligned to detect reflections of the infrared light from the eye. A scan mirror in the SLP sweeps through a range of orientations and the intensities of reflections of the infrared light are monitored by a processor to determine when a spectral reflection or "glint" is produced. The processor determines the orientation of the scan mirror that produced the glint and maps the scan mirror orientation to a region in the field of view of the eye of the user, such as a region in visible display content projected by the WHUD, to determine the gaze direction of the user.

12 Claims, 4 Drawing Sheets

(51) Int. Cl.

| | | |
|---|---|---|
| *G02B 27/00* | (2006.01) | |
| *G02B 5/32* | (2006.01) | |
| *G06F 3/03* | (2006.01) | |
| *G02B 26/10* | (2006.01) | |
| *H04N 9/31* | (2006.01) | |
| *G02B 26/08* | (2006.01) | |

(52) U.S. Cl.
CPC ..... *G02B 27/0172* (2013.01); *G02B 27/0176* (2013.01); *G06F 3/013* (2013.01); *G06F 3/0304* (2013.01); *H04N 9/3102* (2013.01); *H04N 9/3129* (2013.01); *H04N 9/3161* (2013.01); *H04N 9/3194* (2013.01); *G02B 26/0833* (2013.01); *G02B 2027/015* (2013.01); *G02B 2027/0123* (2013.01); *G02B 2027/0174* (2013.01); *G02B 2027/0178* (2013.01)

(58) Field of Classification Search
CPC .......... G02B 27/0093; G02B 2027/014; G02B 2027/0138; G02B 2027/0178; G02B 5/32; G02B 5/188; G02B 26/101; G02B 26/0833; G02B 26/10; A61B 3/113; A61B 3/0033; A61B 3/12; A61B 3/0008; A61B 3/102; A61B 5/0066; A61B 5/6803; A61B 1/00096; A61B 1/00172; G06F 3/013; G06F 3/042; G06F 3/012; G06F 3/0304; G06F 3/0423
See application file for complete search history.

(56) References Cited

U.S. PATENT DOCUMENTS

| | | | |
|---|---|---|---|
| 4,978,213 A | 12/1990 | El Hage | |
| 5,103,323 A | 4/1992 | Magarinos et al. | |
| 5,231,674 A * | 7/1993 | Cleveland | A61B 3/113 351/210 |
| 5,467,104 A | 11/1995 | Furness, III et al. | |
| 5,589,956 A * | 12/1996 | Morishima | G02B 5/32 345/7 |
| 5,596,339 A | 1/1997 | Furness, III et al. | |
| 5,742,421 A | 4/1998 | Wells et al. | |
| 6,008,781 A | 12/1999 | Furness, III et al. | |
| 6,027,216 A | 2/2000 | Guyton et al. | |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,353,503 B1 | 3/2002 | Spitzer et al. | |
| 6,377,277 B1 | 4/2002 | Yamamoto | |
| 6,639,570 B2 | 10/2003 | Furness, III et al. | |
| 6,972,734 B1 | 12/2005 | Ohshima et al. | |
| 7,473,888 B2 | 1/2009 | Wine et al. | |
| 7,637,615 B2 * | 12/2009 | Yamada | G02B 27/0093 351/205 |
| 7,640,007 B2 | 12/2009 | Chen et al. | |
| 7,684,105 B2 | 3/2010 | Lamontagne et al. | |
| 7,747,113 B2 | 6/2010 | Mukawa et al. | |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 7,927,522 B2 | 4/2011 | Hsu | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,355,671 B2 | 1/2013 | Kramer et al. | |
| 8,560,976 B1 | 10/2013 | Kim | |
| 8,634,119 B2 | 1/2014 | Bablumyan et al. | |
| 8,666,212 B1 | 3/2014 | Amirparviz | |
| 8,704,882 B2 | 4/2014 | Turner | |
| 8,922,481 B1 | 12/2014 | Kauffmann et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 9,477,079 B2 | 10/2016 | Bailey et al. | |
| 9,766,449 B2 | 9/2017 | Bailey et al. | |
| 9,904,051 B2 * | 2/2018 | Aleem | G02B 27/0093 |
| 9,916,005 B2 * | 3/2018 | Aronsson | G06F 3/013 |
| 9,936,163 B1 * | 4/2018 | Lubelsky | H04N 7/152 |
| 2001/0033402 A1 | 10/2001 | Popovich | |
| 2002/0003627 A1 | 1/2002 | Rieder | |
| 2002/0007118 A1 | 1/2002 | Adachi et al. | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2004/0174287 A1 | 9/2004 | Deak | |
| 2005/0012715 A1 | 1/2005 | Ford | |
| 2006/0110008 A1 * | 5/2006 | Vertegaal | G06K 9/00604 382/103 |
| 2006/0238707 A1 | 10/2006 | Elvesjo et al. | |
| 2007/0078308 A1 | 4/2007 | Daly | |
| 2007/0132785 A1 | 6/2007 | Ebersole, Jr. et al. | |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 * | 3/2010 | Sugiyama | G02B 26/06 345/8 |
| 2010/0142015 A1 | 6/2010 | Kuwahara et al. | |
| 2010/0149073 A1 | 6/2010 | Chaum et al. | |
| 2010/0150415 A1 | 6/2010 | Atkinson et al. | |
| 2010/0239776 A1 | 9/2010 | Yajima et al. | |
| 2011/0109880 A1 * | 5/2011 | Nummela | A61B 3/113 351/210 |
| 2012/0002256 A1 | 1/2012 | Lacoste et al. | |
| 2012/0105486 A1 * | 5/2012 | Lankford | G06F 3/013 345/661 |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2012/0302289 A1 | 11/2012 | Kang | |
| 2013/0009853 A1 | 1/2013 | Hesselink et al. | |
| 2013/0016292 A1 | 1/2013 | Miao et al. | |
| 2013/0016413 A1 | 1/2013 | Saeedi et al. | |
| 2013/0051631 A1 * | 2/2013 | Hanna | G06K 9/00604 382/117 |
| 2013/0076800 A1 * | 3/2013 | Hatagi | H04N 9/3129 345/690 |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 * | 7/2014 | Yamaguchi | G02B 27/0101 359/633 |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |

(56) References Cited

U.S. PATENT DOCUMENTS

| | | | |
|---|---|---|---|
| 2015/0268821 A1 | 9/2015 | Ramsby et al. | |
| 2015/0325202 A1 | 11/2015 | Lake et al. | |
| 2015/0362734 A1 | 12/2015 | Moser et al. | |
| 2015/0369920 A1* | 12/2015 | Setono | G01S 17/42 356/3.09 |
| 2015/0378162 A1 | 12/2015 | Bailey et al. | |
| 2016/0033771 A1 | 2/2016 | Tremblay et al. | |
| 2016/0085084 A1* | 3/2016 | Masson | G02B 5/0215 359/633 |
| 2016/0166146 A1* | 6/2016 | Sarkar | A61B 3/113 351/210 |
| 2016/0202081 A1 | 7/2016 | Debieuvre et al. | |
| 2016/0238845 A1 | 8/2016 | Alexander et al. | |
| 2016/0274365 A1 | 9/2016 | Bailey et al. | |
| 2016/0274758 A1 | 9/2016 | Bailey | |
| 2016/0327796 A1 | 11/2016 | Bailey et al. | |
| 2016/0327797 A1 | 11/2016 | Bailey et al. | |
| 2016/0349514 A1 | 12/2016 | Alexander et al. | |
| 2016/0349515 A1 | 12/2016 | Alexander et al. | |
| 2016/0349516 A1 | 12/2016 | Alexander et al. | |
| 2016/0377865 A1 | 12/2016 | Alexander et al. | |
| 2016/0377866 A1 | 12/2016 | Alexander et al. | |
| 2017/0068095 A1 | 3/2017 | Holland et al. | |
| 2017/0097753 A1 | 4/2017 | Bailey et al. | |
| 2017/0115483 A1 | 4/2017 | Aleem et al. | |
| 2017/0153701 A1 | 6/2017 | Mahon et al. | |
| 2017/0184847 A1* | 6/2017 | Petrov | G02B 27/017 |
| 2017/0205876 A1 | 7/2017 | Vidal et al. | |
| 2017/0212290 A1 | 7/2017 | Alexander et al. | |
| 2017/0212349 A1 | 7/2017 | Bailey et al. | |
| 2017/0219829 A1 | 8/2017 | Bailey | |
| 2017/0243061 A1* | 8/2017 | Nakashima | G06T 7/269 |
| 2017/0299956 A1 | 10/2017 | Holland et al. | |
| 2017/0343796 A1 | 11/2017 | Bailey et al. | |
| 2017/0343797 A1 | 11/2017 | Bailey et al. | |
| 2018/0007255 A1 | 1/2018 | Tang | |
| 2018/0373024 A1* | 12/2018 | Sugawara | G02B 26/10 |

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2004 |
| WO | 2014/155288 A2 | 10/2014 |
| WO | 2015/123775 A1 | 8/2015 |

OTHER PUBLICATIONS

Ayras et al., "Exit pupil expander with a large field of view based on diffractive optics," *Journal of the SID*, vol. 17, No. 8 (2009), pp. 659-664.
Chellappan et al., "Laser-based display: a review," *Applied Optics*, vol. 49, No. 25 (2010), pp. 79-98.
Cui et al., "Diffraction from angular multiplexing slanted volume hologram gratings," *Optik*, vol. 116 (2005), pp. 118-122.
Curatu et al., "Dual Purpose Lens for an Eye-tracked Projection Head-Mounted Display," *International Optical Design Conference 2006*, SPIE-OSA, vol. 6342 (2007), pp. 63420X-1-63420X-7.
Curatu et al., "Projection-based head-mounted display with eye-tracking capabilities," *Proc. of SPIE*, vol. 5875 (2005), pp. 58750J-1-58750J-9.
Essex, "Tutorial on Optomechanical Beam Steering Mechanisms," College of Optical Sciences, University of Arizona, 2006, 8 pages.
Fernandez et al., "Optimization of a thick polyvinyl alcohol-acrylamide photopolymer for data storage using a combination of angular and peristrophic holographic multiplexing," *Applied Optics*, vol. 45, No. 29 (2006), pp. 7661-7666.
Hainich et al., "Chapter 10: Near-Eye Displays," in: *Displays—Fundamentals & Applications*, 2011, pp. 439-503.
Hornstein et al., "Maradin's Micro-Minor—System Level Synchronization Notes," *SID 2012 Digest* (2012), pp. 981-984.

International Search Report and Written Opinion, dated Apr. 25, 2017, for International Application No. PCT/US2016/067246, 10 pages.
International Search Report and Written Opinion, dated Dec. 8, 2016, for International Application No. PCT/US2016/050225, 15 pages.
International Search Report and Written Opinion, dated Jan. 18, 2017, for International Application No. PCT/US2016/054852, 12 pages.
International Search Report and Written Opinion, dated Jun. 8, 2016, for International Application No. PCT/US2016/018293, 17 pages.
International Search Report and Written Opinion, dated Jun. 8, 2016, for International Application No. PCT/US2016/018298, 14 pages.
International Search Report and Written Opinion, dated Jun. 8, 2016, for International Application No. PCT/US2016/018299, 12 pages.
International Search Report and Written Opinion, dated Oct. 13, 2017, for International Application No. PCT/US2017/040323, 16 pages.
International Search Report and Written Opinion, dated Sep. 28, 2017, for International Application No. PCT/US2017/027479, 13 pages.
Itoh et al., "Interaction-free calibration for optical see-through head-mounted displays based on 3D eye localization," *2014 IEEE Symposium on 3D User Interfaces* (3DUI), (2014), pp. 75-82.
Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.
Kessler, "Optics of Near to Eye Displays (NEDs)," *Oasis 2013*, Tel Aviv, Israel, Feb. 19, 2013, 37 pages.
Kress et al., "A review of head-mounted displays (HMD) technologies and applications for consumer electronics," *Proc. of SPIE*, vol. 8720 (2013), pp. 87200A-1-87200A-13.
Kress et al., "Diffractive and Holographic Optics as Optical Combiners in Head Mounted Displays," *Proceedings of the 2013 ACM Conference on Pervasive and Ubiquitous Computing Adjunct Publication*, Zurich, Switzerland, Sep. 8-12, 2013, pp. 1479-1482.
Kress, "Optical architectures for see-through wearable displays," *Bay Area—SID Seminar*, Bay Area, Apr. 30, 2014, 156 pages.
Levola, "7.1: Invited Paper: Novel Diffractive Optical Components for Near to Eye Displays," *SID Symposium Digest of Technical Papers*, vol. 37, No. 1 (2006), pp. 64-67.
Liao et al., "The Evolution of MEMS Displays," *IEEE Transcations on Industrial Electronics*, vol. 56, No. 4 (2009), pp. 1057-1065.
Lippert, "Chapter 6: Display Devices: RSD (Retinal Scanning Display)," in: *The Avionics Handbook*, 2001, 8 pages.
Majaranta et al., "Chapter 3: Eye-Tracking and Eye-Based Human-Computer Interaction," in *Advances in Physiological Computing*, 2014, pp. 39-65.
Merriam-Webster, "Radio Frequencies" retrieved from https://www.merriam-webster.com/table/collegiate/radiofre.htm, retrieved on Jul. 12, 2017, 2 pages.
Schowengerdt et al., "Stereoscopic retinal scanning laser display with integrated focus cues for ocular accommodation," *Proc. of SPIE-IS&T Electronic Imaging*, vol. 5291 (2004), pp. 366-376.
Silverman et al., "58.5L: Late-News Paper: Engineering a Retinal Scanning Laser Display with Integrated Accommodative Depth Cues," *SID 03 Digest*, (2003), pp. 1538-1541.
Takatsuka et al., "Retinal projection display using diffractive optical element," *Tenth International Conference on Intelligent Information Hiding and Multimedia Signal Processing*, IEEE, (2014), pp. 403-406.
Urey et al., "Optical performance requirements for MEMS-scanner based microdisplays," *Conf on MOEMS and Miniaturized Systems*, SPIE, vol. 4178 (2000), pp. 176-185.
Urey, "Diffractive exit-pupil expander for display applications," *Applied Optics*, vol. 40, No. 32 (2001), pp. 5840-5851.

(56) References Cited

OTHER PUBLICATIONS

Viirre et al., "The Virtual Retina Display: A New Technology for Virtual Reality and Augmented Vision in Medicine," *Proc. of Medicine Meets Virtual Reality* (1998), pp. 252-257.

* cited by examiner

SYSTEMS, DEVICES, AND METHODS FOR LASER EYE TRACKING IN WEARABLE HEADS-UP DISPLAYS

TECHNICAL FIELD

The present systems, devices, and methods generally relate to scanning laser-based eye tracking technologies and particularly relate to integrating eye tracking functionality into a scanning laser projector-based wearable heads-up display.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Eye Tracking

Eye tracking is a process by which the position, orientation, and/or motion of the eye may be measured, detected, sensed, determined (collectively, "measured"), and/or monitored. In many applications, this is done with a view towards determining the gaze direction of a user. The position, orientation, and/or motion of the eye may be measured in a variety of different ways, the least invasive of which typically employ one or more optical sensor(s) (e.g., cameras) to optically track the eye. Common techniques involve illuminating or flooding the entire eye, all at once, with infrared light and measuring reflections with at least one optical sensor that is tuned to be sensitive to the infrared light. Information about how the infrared light is reflected from the eye is analyzed to determine the position(s), orientation(s), and/or motion(s) of one or more eye feature(s) such as the cornea, pupil, iris, and/or retinal blood vessels.

Eye tracking functionality is highly advantageous in applications of wearable heads-up displays. Some examples of the utility of eye tracking in wearable heads-up displays include: influencing where content is displayed in the user's field of view, conserving power by not displaying content that is outside of the user's field of view, influencing what content is displayed to the user, determining where the user is looking or gazing, determining whether the user is looking at displayed content on the display or through the display at their external environment, and providing a means through which the user may control/interact with displayed content. However, incorporating eye tracking functionality in a wearable heads-up display conventionally adds unwanted bulk to the system. Eye tracking systems available today generally implement multiple dedicated components with very stringent positioning requirements which undesirably increase the overall size and form factor of the system when incorporated into a wearable heads-up display. There is a need in the art for systems, devices, and methods of eye tracking that can integrate into wearable heads-up displays with minimal effect on the size and form factor of the system.

BRIEF SUMMARY

A method of determining a gaze direction of an eye of a user may be summarized as including: generating an infrared laser light by an infrared laser diode; scanning the infrared laser light over the eye of the user by at least one scan mirror, wherein scanning the infrared laser light over the eye of the user by the at least one scan mirror includes sweeping the at least one scan mirror through a range of orientations and, for a plurality of orientations of the at least one scan mirror, reflecting the infrared laser light to a respective region of the eye of the user, for example along an optical path that extends between the scan mirror and the eye of the user; detecting reflections of the infrared laser light from the eye of the user by at least one infrared photodetector; determining a respective intensity of a plurality of detected reflections of the infrared laser light by at least one processor communicatively coupled to the at least one infrared photodetector; identifying, by the processor, at least one detected reflection for which the intensity exceeds a threshold value; determining, by the processor, the orientation of the at least one scan mirror that corresponds to the at least one detected reflection for which the intensity exceeds the threshold value; and determining, by the processor, a region in a field of view of the eye of the user at which a gaze of the eye is directed based on the orientation of the at least one scan mirror that corresponds to the at least one detected reflection for which the intensity exceeds the threshold value.

Scanning the infrared laser light over the eye of the user by at least one scan mirror may include scanning, by the at least one scan mirror, the infrared laser light over an area of a holographic optical element positioned in the field of view of the eye of the user and redirecting the infrared laser light towards the eye of the user by the holographic optical element. Redirecting the infrared laser light towards the eye of the user by the holographic optical element may include converging the infrared laser light to an exit pupil at the eye of the user by the holographic optical element, where the exit pupil encompasses at least the cornea of the eye of the user.

Scanning the infrared laser light over the eye of the user by at least one scan mirror may include scanning the infrared laser light across a first dimension of the eye of the user by a first scan mirror and scanning the infrared laser light across a second dimension of the eye of the user by a second scan mirror. In this case: sweeping the at least one scan mirror through a range of orientations may include sweeping the first scan mirror through a first range of orientations and, for each respective orientation of the first scan mirror, sweeping the second scan mirror through a second range of orientations; for a plurality of orientations of the at least one scan mirror, reflecting the infrared laser light to a respective region of the eye of the user may include, for a plurality of combinations of a first orientation of the first scan mirror and a second orientation of the second scan mirror, reflecting the infrared laser light to a respective region of the eye of the user; determining, by the processor, the orientation of the at least one scan mirror that corresponds to the at least one detected reflection for which the intensity exceeds the threshold value may include determining, by the processor, the combination of the first orientation of the first scan mirror and the second orientation of the second scan mirror that corresponds to the at least one detected reflection for which the intensity exceeds the threshold value; and determining, by the processor, a region in a field of view of the eye of the user at which a gaze of the eye is directed based on the orientation of the at least one scan mirror that corresponds to the at least one detected reflection for which the intensity exceeds the threshold value may include determining, by the processor, the region in the field of view of the eye of the user at which the gaze of the eye is directed based on the combination of the first orientation of the first scan mirror and the second orientation of the second scan mirror that corresponds to the at least one detected reflection for which the intensity exceeds the threshold value.

Identifying, by the processor, at least one detected reflection for which the intensity exceeds a threshold value may include detecting, by the infrared photodetector, a spectral reflection of the infrared laser light from the eye of the user.

Identifying, by the processor, at least one detected reflection for which the intensity exceeds a threshold value may include sampling, by the processor, a signal from the infrared photodetector and identifying, by the processor, a first sample for which the magnitude exceeds a threshold magnitude. In this case, identifying, by the processor, at least one detected reflection for which the intensity exceeds a threshold value may further include identifying, by the processor, a second sample for which the magnitude does not exceed the threshold magnitude.

Determining, by the processor, a region in a field of view of the eye of the user at which a gaze of the eye is directed based on the orientation of the at least one scan mirror that corresponds to the at least one detected reflection for which the intensity exceeds the threshold value may include effecting, by the processor, a mapping between the orientation of the at least one scan mirror that corresponds to the at least one detected reflection for which the intensity exceeds the threshold value and the field of view of the eye of the user. Effecting, by the processor, a mapping between the orientation of the at least one scan mirror that corresponds to the at least one detected reflection for which the intensity exceeds the threshold value and the field of view of the eye of the user may include performing, by the processor, at least one transformation selected from a group consisting of: a linear transformation between a set of scan mirror orientations and a set of gaze directions of the eye of the user, a geometric transformation between a set of scan mirror orientations and a set of gaze directions of the eye of the user, an affine transformation between a set of the scan mirror orientations and a set of gaze directions of the eye of the user, and a neural network transformation between a set of scan mirror orientations and a set of gaze directions of the eye of the user.

The infrared laser diode and the at least scan mirror may be components of a scanning laser projector, the scanning laser projector may further include at least one additional laser diode to generate visible laser light, and the method may further include projecting visible display content in the field of view of the eye of the user by the scanning laser projector. In this case, determining, by the processor, a region in a field of view of the eye of the user at which a gaze of the eye is directed based on the orientation of the at least one scan mirror that corresponds to the at least one detected reflection for which the intensity exceeds the threshold value may include determining, by the processor, a region of the visible display content at which the gaze of the eye is directed based on the orientation of the at least one scan mirror that corresponds to the at least one detected reflection for which the intensity exceeds the threshold value. Determining, by the processor, a region of the visible display content at which the gaze of the eye is directed based on the orientation of the at least one scan mirror that corresponds to the at least one detected reflection for which the intensity exceeds the threshold value may include performing, by the processor, at least one transformation selected from a group consisting of: a linear transformation between a set of scan mirror orientations and a set of regions of the visible display content, a geometric transformation between a set of scan mirror orientations and a set of regions of the visible display content, an affine transformation between a set of the scan mirror orientations and a set of regions of the visible display content, and a neural network transformation between a set of scan mirror orientations and a set of regions of the visible display content. The at least one infrared photodetector may be positioned at a first position at a periphery of the field of view of the eye of the user when the eye is gazing straight ahead, and projecting visible display content in the field of view of the eye of the user by the scanning laser projector may include positioning, by the scanning laser projector, the visible display content away-from-center in the field of view of the eye of the user and towards the position of the at least one infrared photodetector at the periphery of the field of view of the eye of the user.

A wearable heads-up display may be summarized as including: a support frame that in use is worn on a head of a user; a scanning laser projector carried by the support frame, the scanning laser projector including: an infrared laser diode; at least one visible light laser diode; and at least one scan mirror; an infrared photodetector carried by the support frame; a processor carried by the support frame, the processor communicatively coupled to the scanning laser projector and the at least one infrared photodetector; and a non-transitory processor-readable storage medium communicatively coupled to the processor, wherein the non-transitory processor-readable storage medium stores data and/or processor-executable instructions that, when executed by the processor, cause the wearable heads-up display to: generate an infrared laser light by the infrared laser diode; scan the infrared laser light over the eye of the user by the at least one scan mirror, wherein scanning the infrared laser light over the eye of the user by the at least one scan mirror includes sweeping the at least one scan mirror through a range of orientations and, for a plurality of orientations of the at least one scan mirror, reflecting the infrared laser light to a respective region of the eye of the user; detect reflections of the infrared laser light from the eye of the user by the at least one infrared photodetector; determine a respective intensity of a plurality of detected reflections of the infrared laser light by the processor; identify, by the processor, at least one detected reflection for which the intensity exceeds a threshold value; determine, by the processor, the orientation of the at least one scan mirror that corresponds to the at least one detected reflection for which the intensity exceeds the threshold value; and determine, by the processor, a region in a field of view of the eye of the user at which a gaze of the eye is directed based on the orientation of the at least one scan mirror that corresponds to the at least one detected reflection for which the intensity exceeds the threshold value.

The wearable heads-up display may further include: a wavelength-multiplexed holographic optical element carried by the support frame and positioned within a field of view of an eye of the user when the support frame is worn on the head of the user, the wavelength-multiplexed holographic optical element aligned to receive both the infrared light and the visible light from the scanning laser projector and to redirect both the infrared light and the visible light towards the eye of the user when the support frame is worn on the head of the user, wherein the wavelength-multiplexed holographic optical element includes a first hologram that is responsive to the visible light and unresponsive to the infrared light and a second hologram that is responsive to the infrared light and unresponsive to the visible light, and wherein the wavelength-multiplexed holographic optical element is substantially transparent to environmental light. The first hologram that is responsive to the visible light may converge the visible light to a first exit pupil at the eye of the user and the second hologram that is responsive to the infrared light may converge the infrared light to a second exit pupil at the eye of the user, the first exit pupil contained within the second exit pupil at the eye of the user.

The non-transitory processor-readable storage medium may further store data and/or processor-executable instructions that, when executed by the processor, cause the wearable heads-up display to project visible display content in the field of view of the eye of the user by the scanning laser projector. In this case, the data and/or processor-executable instructions that, when executed by the processor, cause the wearable heads-up display to determine, by the processor, a region in a field of view of the eye of the user at which a gaze of the eye is directed based on the orientation of the at least one scan mirror that corresponds to the at least one detected reflection for which the intensity exceeds the threshold value, may cause the wearable heads-up display to determine, by the processor, a region of the visible display content at which the gaze of the eye is directed based on the orientation of the at least one scan mirror that corresponds to the at least one detected reflection for which the intensity exceeds the threshold value. The at least one infrared photodetector may be positioned on the support frame at a periphery of the field of view of the eye of the user when the eye is gazing straight ahead, and the data and/or processor-executable instructions that, when executed by the processor, cause the WHUD to project visible display content in the field of view of the eye of the user by the scanning laser projector, may cause the scanning laser projector to position the visible display content away-from-center in the field of view of the eye of the user and towards the position of the at least one infrared photodetector at the periphery of the field of view of the eye of the user.

The support frame may have a general shape and appearance of a pair of eyeglasses. The at least one visible light laser diode in the scanning laser projector may include at least one visible light laser diode selected from a group consisting of: a red laser diode, a green laser diode, a blue laser diode, and any combination of a red laser diode, a green laser diode, and/or a blue laser diode.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for laser eye tracking in wearable heads-up displays. More specifically, the various embodiments described herein provide methods of determining the gaze direction of an eye of a user and are particularly well-suited for use in wearable heads-up displays ("WHUDs") that employ scanning laser projectors ("SLPs"). Examples of WHUD systems, devices, and methods that are particularly well-suited for use in conjunction with the present systems, devices, and methods for laser eye tracking are described in, for example, U.S. Non-Provisional patent application Ser. No. 15/167,458, U.S. Non-Provisional patent application Ser. No. 15/167,472, and U.S. Non-Provisional patent application Ser. No. 15/167,484.

Figure 1:
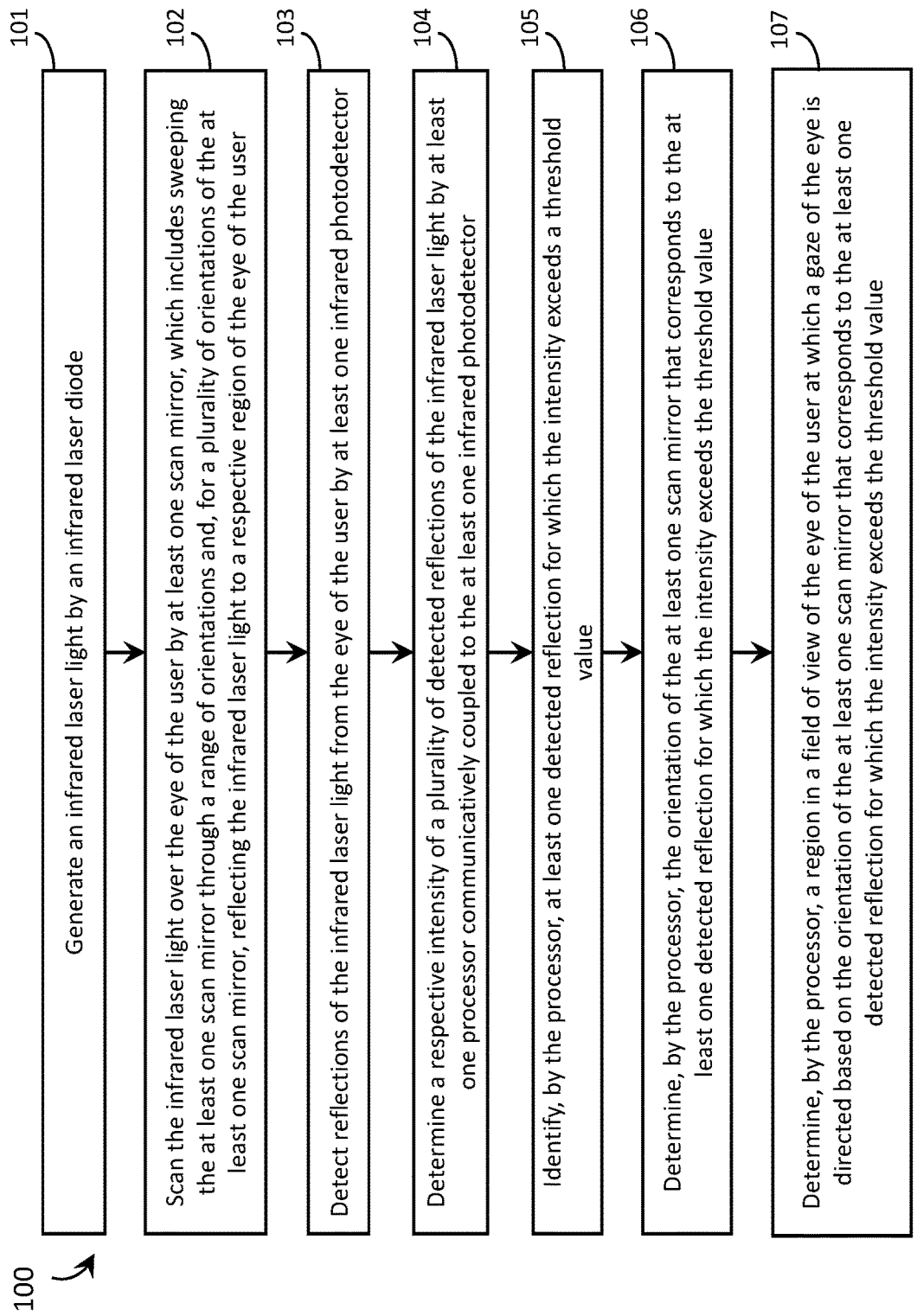
FIG. 1 is a flow-diagram showing a method of determining a gaze direction of an eye of a user in accordance with the present systems, devices, and methods.

FIG. 1 is a flow-diagram showing a scanning laser-based method 100 of determining a gaze direction of an eye of a user in accordance with the present systems, devices, and methods. Method 100 includes seven acts 101, 102, 103, 104, 105, 106, and 107, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 100, the term "user" refers to a person that is operating and/or wearing the hardware elements described in acts 101-107 (e.g., a person that is wearing a wearable heads-up display, as described in more detail later on).

At 101, an infrared laser diode generates infrared laser light. Depending on the specific implementation, the infrared laser diode may activate and remain active in order to continuously generate a continuous beam of infrared laser light, or the infrared laser diode may be modulated to generate a sequence or pattern of infrared laser light. Throughout this specification and the appended claims, the term "infrared" includes "near infrared" and generally refers to a wavelength of light that is larger than the largest wavelength of light that is typically visible to the average human eye. Light that is visible to the average human eye (i.e., "visible light" herein) is generally in the range of 400 nm-700 nm, so as used herein the term "infrared" refers to a wavelength that is greater than 700 nm, up to 1 mm. As used herein and in the claims, visible means that the light includes wavelengths within the human visible portion of the electromagnetic spectrum, typically from approximately 400 nm (violet) to approximately 700 nm (red).

At 102, at least one scan mirror scans the infrared laser light over the eye of the user. Depending on the modulation of the infrared laser diode, the at least one scan mirror may scan the infrared laser light over (e.g., completely illuminate) a substantially continuous surface of the eye or the at least one scan mirror may scan the infrared laser light to form an illumination pattern on the surface of the eye (such as a grid pattern, a crosshairs pattern, and so on). Generally, in order for the at least one scan mirror to scan the infrared laser light over the eye of the user, the at least one scan mirror may sweep through a range of orientations and, for a plurality of orientations of the at least one scan mirror (i.e., for each respective orientation of the at least one scan mirror if the infrared laser diode is continuously active in order to completely illuminate the corresponding surface of the eye, or for a subset of orientations of the at least one scan mirror if the infrared laser diode is modulated such that the combination of subsets of orientations of the at least one scan mirror and the modulation pattern of the infrared laser diode produces an illumination pattern on the corresponding surface of the eye), the at least one scan mirror may receive the infrared laser light from the infrared laser diode and reflect the infrared laser light to a respective region of the eye of the user.

The at least one scan mirror may include one or multiple (e.g., in a DLP configuration) digital microelectromechanical systems ("MEMS") mirror(s) or one or multiple piezoelectric mirrors.

In some implementations, at 102 the at least one scan mirror may scan infrared laser light directly over at least a portion of the eye of the user. That is, infrared light may travel directly from the at least one scan mirror to the eye of the user without being redirected along the way by any intervening optics. In other implementations (e.g., in applications in which method 100 is performed by a scanning laser-based WHUD), at 102 the at least one scan mirror may indirectly scan infrared laser light over at least a portion of the eye of the user by scanning the infrared laser light over an area, or through a volume, of a light-redirection element (such as a holographic optical element ("HOE") comprising at least one hologram, a diffraction grating, a mirror, a partial mirror, and/or a waveguide structure) positioned in the field of view of the eye of the user and the light-redirection element may redirect the infrared laser light towards the eye of the user. That is, infrared light may travel from the at least one scan mirror to any number of intervening optics (e.g., HOEs, waveguides, etc.) and ultimately arrive at the eye of the user after any number of further redirections by the intervening optics. In implementations that employ such indirect scanning, the light-redirection element (e.g., the HOE or waveguide) may, upon redirection of the infrared laser light towards the eye of the user, converge the infrared laser light to an exit pupil at the eye of the user, where the exit pupil encompasses, for example, at least the cornea of the eye of the user (when the user is looking in a specific direction, such as straight ahead or straight towards display content displayed by a WHUD). In alternative implementations, the exit pupil may encompass only the pupil of the eye of the user, or only a region of the eye of the user where the "glint" is expected to occur (i.e., an area less than the cornea of the eye of the user).

At 103, reflections of the infrared laser light from the eye of the user are detected by at least one infrared sensor, such as an infrared detector or, more specifically, an infrared photodetector. As will be discussed in more detail later on, the at least one infrared sensor may be communicatively coupled to a processor (e.g., a digital processor, or an application-specific integrated circuit) and provide an output signal having a magnitude that depends on an intensity of the infrared laser light detected by the infrared sensor.

At 104, at least one processor communicatively coupled to the at least one infrared sensor determines a respective intensity of a plurality of the reflections of the infrared laser light detected by the infrared sensor (i.e., "detected reflections") at 103. The percentage of detected reflections for which the processor determines an intensity may depend on, for example, the sampling rate of the processor. The "intensity" of a detected reflection may be a measure of, for example, the brightness of the detected reflection, the luminance of the detected reflection, and/or the power of the detected reflection.

At 105, the processor identifies at least one detected reflection for which the intensity exceeds a threshold value. Generally, the at least one infrared sensor may be oriented to detect both spectral and diffuse reflections of the infrared laser light from the eye of the user; however, in some implementations the processor may specifically identify, at 105, a detected reflection for which the intensity exceeds a threshold value only when the infrared sensor detects, at 103, a spectral reflection of the infrared laser light from the eye of the user. Such spectral reflection may, for example, correspond to the cornea reflection, first Purkinje image, or "glint."

As previously described, the processor may sample the signal output by the at least one infrared sensor, where the magnitude of the signal (and therefore the magnitude of each sample) depends on the intensity of the infrared laser light detected by the at least one infrared sensor. In this case, the processor may identify at least one detected reflection for which the intensity exceeds a threshold value by identifying a first sample (in a series of samples) for which the magnitude exceeds a threshold magnitude. In other words, identifying, by the processor, at least one detected reflection for which the intensity exceeds a threshold value may be an edge-triggered (e.g., rising edge-triggered) process. If desired, the processor may then continue to identify that subsequent detected reflections each have intensities that do exceed the threshold until the processor identifies a second sample in the series for which the magnitude does not exceed the threshold magnitude (e.g., a falling edge-triggered process).

At 106, the processor determines the orientation of the at least one scan mirror that corresponds to the at least one detected reflection for which the intensity exceeds the threshold value. In other words, the processor determines which orientation of the at least one scan mirror (from 102) caused the infrared laser light to reflect from the eye of the user (as detected at 103) with an intensity that exceeds the threshold value (as determined at 104 and 105).

At 107, the processor determines a region in a field of view of the eye of the user at which a gaze of the eye is directed based on the orientation of the at least one scan mirror that corresponds to the at least one detected reflection for which the intensity exceeds the threshold value (as determined at 106). Generally, this may include effecting, by the processor, a mapping between the orientation of the at least one scan mirror that corresponds to the at least one detected reflection for which the intensity exceeds the threshold value and the field of view of the eye of the user.

As an example, at 103 through 106, the processor may essentially effect a mapping between "detected reflection space" and "mirror orientation space" which, since only detected reflections that exceed the threshold value are of interest and since detected reflections that exceed the threshold value may generally be "glints," may be interpreted as a mapping between "glint space" and "mirror orientation space." At 107, then, the processor may essentially effect a mapping between "mirror orientation space" and gaze direction of the eye based on established correlations between various mirror orientations and where the corresponding infrared laser light would appear in the user's field of view (e.g., if redirected by a light-redirection element such as an HOE positioned in the user's field of view) if the infrared laser light was visible to the user. In this way, acts 103-107 may essentially effect a mapping between "glint space" and "gaze direction space."

Fundamentally, the processor may, at 107, effect a mapping between the orientation of the at least one scan mirror that corresponds to the at least one detected reflection for which the intensity exceeds the threshold value (e.g., "glint space") and the field of view of the eye of the user (e.g., "field of view space") by performing at least one transformation between a set of scan mirror orientations and a set of gaze directions of the eye of the user, such as a linear transformation, a geometric transformation, an affine transformation, and/or a neural network-based transformation.

Depending on the specific implementation, the at least one scan mirror may include a single scan mirror that is controllably orientable about two orthogonal axes or two scan mirrors that are each respectively controllable about a respective axis, with the respective axes about which the two scan mirrors are controllably orientable being orthogonal to one another. For example, at 102, a single scan mirror may scan the infrared laser light over two dimensions of the user's eye, or a first scan mirror may scan the infrared laser light across a first dimension of the eye and a second scan mirror may scan the infrared laser light across a second dimension of the eye. At 102, the "at least one scan mirror" was said to "sweep through a range of orientations." In the case of two orthogonal scan mirrors, this may mean that a first scan mirror sweeps through a first range of orientations and, for each respective orientation of the first scan mirror, a second scan mirror sweeps through a second range of orientations. It follows that where, at 102, "for a plurality of orientations of the at least one scan mirror, the at least one scan mirror receives the infrared laser light from the infrared laser diode and reflects the infrared laser light to (either directly or indirectly via, e.g., an HOE or waveguide) a respective region of the eye of the user," with two orthogonal scan mirrors the infrared laser light is reflected to a respective region of the eye of the user for each respective combination of a first orientation of the first scan mirror and a second orientation of the second scan mirror. Furthermore, with two orthogonal scan mirrors the processor may determine, at 106, the combination of the first orientation of the first scan mirror and the second orientation of the second scan mirror that corresponds to the at least one detected reflection for which the intensity exceeds the threshold value and the processor may, at 107, determine the region in the field of view of the eye of the user at which the gaze of the eye is directed based on the combination of the first orientation of the first scan mirror and the second orientation of the second scan mirror that corresponds to the at least one detected reflection for which the intensity exceeds the threshold value.

As previously described, method 100 may be particularly advantageous when implemented in a WHUD that employs a SLP because in such an implementation the eye tracking (i.e., gaze direction detection) functionality of method 100 may be achieved with minimal hardware additions (and correspondingly minimal bulk and impact on aesthetic design) to the WHUD. In this case, method 100 may be extended to include a projection of display content to the user and a determination of where in the display content the user's gaze is directed.

For example, the infrared laser diode and the at least one scan mirror of method 100 may be components of a SLP, and the SLP may further include at least one additional laser diode to generate visible laser light. In this case, method 100 may be extended to include projecting visible display content in the field of view of the eye of the user by the SLP and, at 107, the processor may determine a region of the visible display content at which the gaze of the eye is directed based on the orientation of the at least one scan mirror that corresponds to the at least one detected reflection for which the intensity exceeds the threshold value. The processor may determine a region of the visible display content at which the gaze of the eye is directed by performing a transformation between a set of scan mirror orientations and a set of regions of the visible display content. In other words, the processor may effect a mapping between "mirror orientation space" (or "glint space," as previously described) and "display space."

A position of the at least one infrared sensor (e.g., the at least one infrared photodetector) relative to the eye of the user is an important design parameter that may influence the overall performance of method 100 and against which various acts of method 100 (e.g., acts 104 and 105) must be calibrated. Generally, the at least one infrared sensor may be positioned at a first position that corresponds to a periphery of the field of view of the eye of the user when the eye is gazing straight ahead (such that the at least one infrared photodetector does not obstruct the user's field of view when the user is gazing straight ahead). In order to maximize the resolution and overall performance of the gaze detection achieved by method 100, it can be advantageous for the at least one infrared photodetector to be positioned and oriented such that it has maximal "visibility" of the gaze directions of interest, which may generally be achieved by, in some exemplary implementations, positioning the at least one infrared photodetector as close as possible to the center of the range of gaze directions of interest without obscuring the user's field of view. When method 100 is implemented in a SLP-based WHUD, this means positioning the at least one infrared sensor at or proximate a center axis of the display content or, conversely, operating the SLP to position the display content away-from-center in the field of view of the eye of the user and towards the position of the at least one infrared sensor at the periphery of the field of view of the eye of the user.

Figure 2:
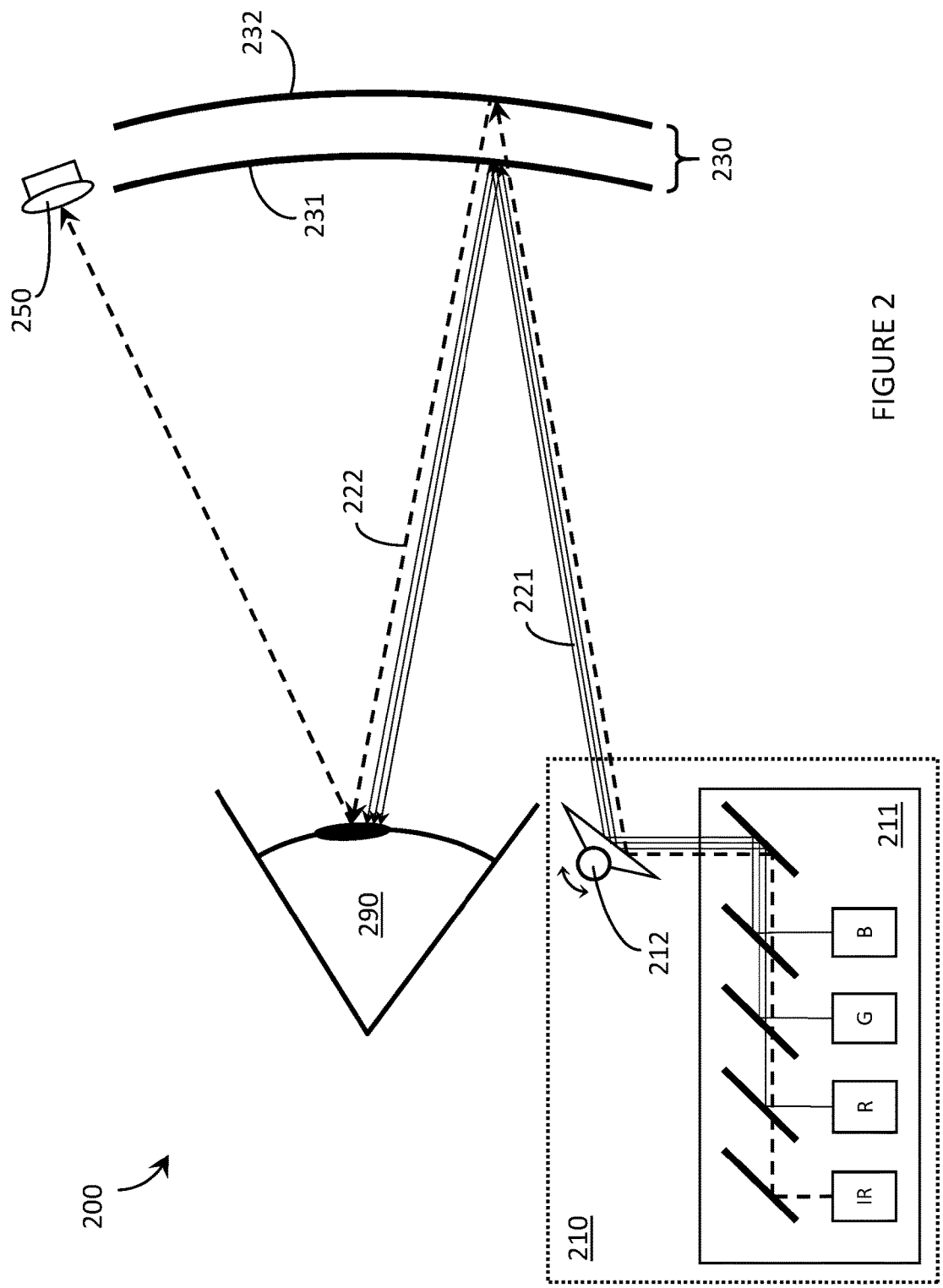
FIG. 2 is an illustrative diagram showing a side view of a wearable heads-up display that is operative to perform the method of FIG. 1 in accordance with the present systems, devices, and methods.

FIG. 2 is an illustrative diagram showing a WHUD 200 that includes a SLP 210 with an integrated eye tracking functionality in accordance with the present systems, devices, and methods. In WHUD 200 scanning laser projection and eye tracking components are both integrated into a single package/module 210. Specifically, SLP 210 comprises a laser module 211 that includes red laser diode (labelled "R" in FIG. 2), a green laser diode (labelled "G" in FIG. 2), and a blue laser diode (labelled "B" in FIG. 2) and a scan mirror 212 (a single mirror illustrated for simplicity, though as previously described at least two orthogonally-orientable mirrors may be used). In addition, laser module 211 also includes an infrared laser diode (labelled "IR" in FIG. 2) for use in eye tracking/gaze detection. Scan mirror 212 simultaneously serves as both the scan mirror for laser projection and a scan mirror for eye tracking, whereby scan mirror 212 scans infrared laser light (represented by dashed lines 222 in FIG. 2) over the area of eye 290 to sequentially illuminate an area of eye 290 (e.g., via a raster scan of IR light). In WHUD 200, an infrared laser diode is integrated into laser module 211 of SLP 210 and scan mirror 212 serves to scan both visible (R, G, and/or B) and infrared (IR) laser light over eye 290.

Scan mirror 212 may advantageously include one or multiple (e.g., in a DLP configuration) digital microelectromechanical systems ("MEMS") mirror(s). In typical operation, scan mirror 212 of SLP 210 repeatedly scans over its entire range of orientations and effectively scans over the entire field of view of the display. Whether or not an image/pixel is projected at each scan orientation depends on controlled modulation of laser module 211 and its synchronization with scan mirror 212. The fact that scan mirror 212 generally scans over its entire range during operation as a laser projector makes scan mirror 212 of SLP 210 compatible with use for eye tracking purposes. SLP 210 is adapted to provide eye tracking functionality without having to compromise or modify its operation as a SLP. In operation, scan mirror 212 repeatedly scans over its entire range of orientations while the RGB laser diodes are modulated to provide the visible light 221 corresponding to pixels of a scanned image or, generally, "display content." At the same time, the infrared laser diode may be activated to illuminate the user's eye 290 (one spot or pixel at a time, each corresponding to a respective scan mirror orientation) with infrared laser light 222 for eye tracking purposes. Depending on the implementation, the infrared laser diode may simply be on at all times to completely illuminate (i.e., scan over the entire area of) eye 290 with infrared laser light 222 or the infrared laser diode may be modulated to provide an illumination pattern (e.g., a grid, a set of parallel lines, a crosshair, or any other shape/pattern) on eye 290. Because infrared laser light 222 is invisible to eye 290 of the user, infrared laser light 222 does not interfere with the scanned image being projected by SLP 210.

In order to detect the (e.g., portions of) infrared laser light 222 that reflects from eye 290, WHUD 200 includes at least one infrared photodetector 250. While only one photodetector 250 is depicted in FIG. 2, in alternative embodiments any number of photodetectors 250 may be used (e.g., an array of photodetectors 250, or a charge-coupled device based camera that is responsive to light in the infrared wavelength range) positioned in any arrangements and at any desired location(s) depending on the implementation.

As scan mirror 212 scans modulated R, G, and/or B light 221 over eye 290 to produce display content based on modulation of the R, G, and/or B laser diodes, scan mirror 212 also scans infrared laser light 222 over eye 290 based on modulation of the IR laser diode. Photodetector 250 detects an intensity pattern or map of reflected infrared laser light 222 that depends on the position/orientation of eye 290. That is, each distinct orientation of scan mirror 212 may result in a respective intensity of infrared laser light 222 being detected by photodetector 250 that depends on the position/orientation of eye 290 (or the position/orientation of feature(s) of eye 290, such as the cornea, iris, pupil, and so on). The intensity pattern/map detected by photodetector 250 depends on where eye 290 is looking. In this way, the same SLP 210 in WHUD 200 enables both i) image projection, and ii) the gaze direction and movements of eye 290 to be measured and tracked.

Another adaptation to WHUD 200, for the purpose of integrating eye tracking functionality into SLP 210, is wavelength-multiplexing of HOE 230. WHUD 200 includes a HOE 230 that redirects laser light output from the laser module 211 of SLP 210 towards eye 290; however, in WHUD 200, HOE 230 includes at least two wavelength-multiplexed holograms: at least a first hologram 231 that is responsive to (i.e., redirects at least a portion of, the magnitude of the portion depending on the playback efficiency of the first hologram) the visible light 221 output by laser module 211 and unresponsive to (i.e., transmits) the infrared light 222 output by laser module 211, and a second hologram 232 that is responsive to (i.e., redirects at least a portion of, the magnitude of the portion depending on the playback efficiency of the second hologram) the infrared light 222 output by laser module 211 and unresponsive to (i.e., transmits) the visible light 221 output by laser module 211. While FIG. 2 depicts first hologram 231 as a single hologram, in practice the aspect(s) of HOE 230 that is/are responsive to the visible light 221 output by laser module 211 may include any number of holograms that may be multiplexed in a variety of different ways, including without limitation: wavelength multiplexed (i.e., a "red" hologram that is responsive to only red light from the red laser diode of laser module 211, a "green" hologram that is responsive to only green light from the green laser diode of laser module 211, and a "blue" hologram that is responsive to only blue light from the blue laser diode of laser module 211), angle multiplexed (e.g., for the purpose of eye box expansion/replication), phase multiplexed, spatially multiplexed, temporally multiplexed, and so on. Upon redirection of visible light 221, first hologram 231 may apply a first optical power to visible light 221. Advantageously, the first optical power applied by first hologram 231 (or by the first set of multiplexed holograms if the implementation employs a set of multiplexed holograms for redirecting the visible light 221) may be a positive optical power that focuses or converges the visible light 221 to, for example, an exit pupil having a diameter less than one centimeter (e.g., 6 mm, 5 mm, 4 mm, 3 mm) at the eye 290 of the user for the purpose of providing a clear and focused image with a wide field of view. Upon redirection of infrared light 222, second hologram 232 may apply a second optical power to infrared light 222, where the second optical power applied by second hologram 232 is different from the first optical power applied by first hologram 231. Advantageously, the first optical power may be greater than the second optical power (and therefore, the second optical power may be less than the first optical power) so that second hologram 232 redirects infrared light 222 over an area of eye 290 that is larger than the exit pupil of visible light 221 at eye 290. In other words, the first hologram that is responsive to the visible light may converge the visible light to a first exit pupil at the eye of the user and the second hologram that is responsive to the infrared light may converge the infrared light to a second exit pupil at the eye of the user, where the first exit pupil is completely contained within the second exit pupil at the eye of the user. For example, the second optical power of second hologram 232 may apply a rate of convergence to infrared light 222 that is less than the rate of convergence applied to visible light 221 by the first optical power of first hologram 231, or the second optical power may be zero such that second hologram 232 redirects infrared light 222 towards eye 290 without applying any convergence thereto, or the second optical power may be negative (i.e., less than zero) so that the second optical power of second hologram 232 causes infrared light 222 to diverge (i.e., applies a rate of divergence thereto) to cover, for example, the entire area of eye 290 (and beyond, if desired) for the purpose of illuminating a large area of eye 290 and tracking all eye positions/motions within that illuminated area.

Depending on the specific implementation, HOE 230 may comprise a single volume of holographic material (e.g., photopolymer or a silver halide compound) that encodes, carries, has embedded therein or thereon, or generally includes both first hologram 231 and second hologram 232, or alternatively HOE 230 may comprise at least two distinct layers of holographic material (e.g., photopolymer and/or a silver halide compound) that are laminated or generally layered together, a first layer of holographic material that includes first hologram 231 and a second layer of holographic material that includes second hologram 232. More details of an exemplary multiplexed HOE are described later on with reference to FIG. 3. In alternative implementations, other optics (such as waveguides, grating structures, and combinations thereof) may substitute for HOE 230 to achieve similar functionality.

The use of infrared light is advantageous in eye tracking systems because infrared light is invisible to the (average) human eye and so does not disrupt or interfere with other optical content being displayed to the user. Integrating an infrared laser diode into a SLP, in accordance with the present systems, devices, and methods, enables visible laser projection and invisible eye tracking to be simultaneously performed by substantially the same hardware of a WHUD, thereby minimizing overall bulk and processing/power requirements of the system.

Figure 3:
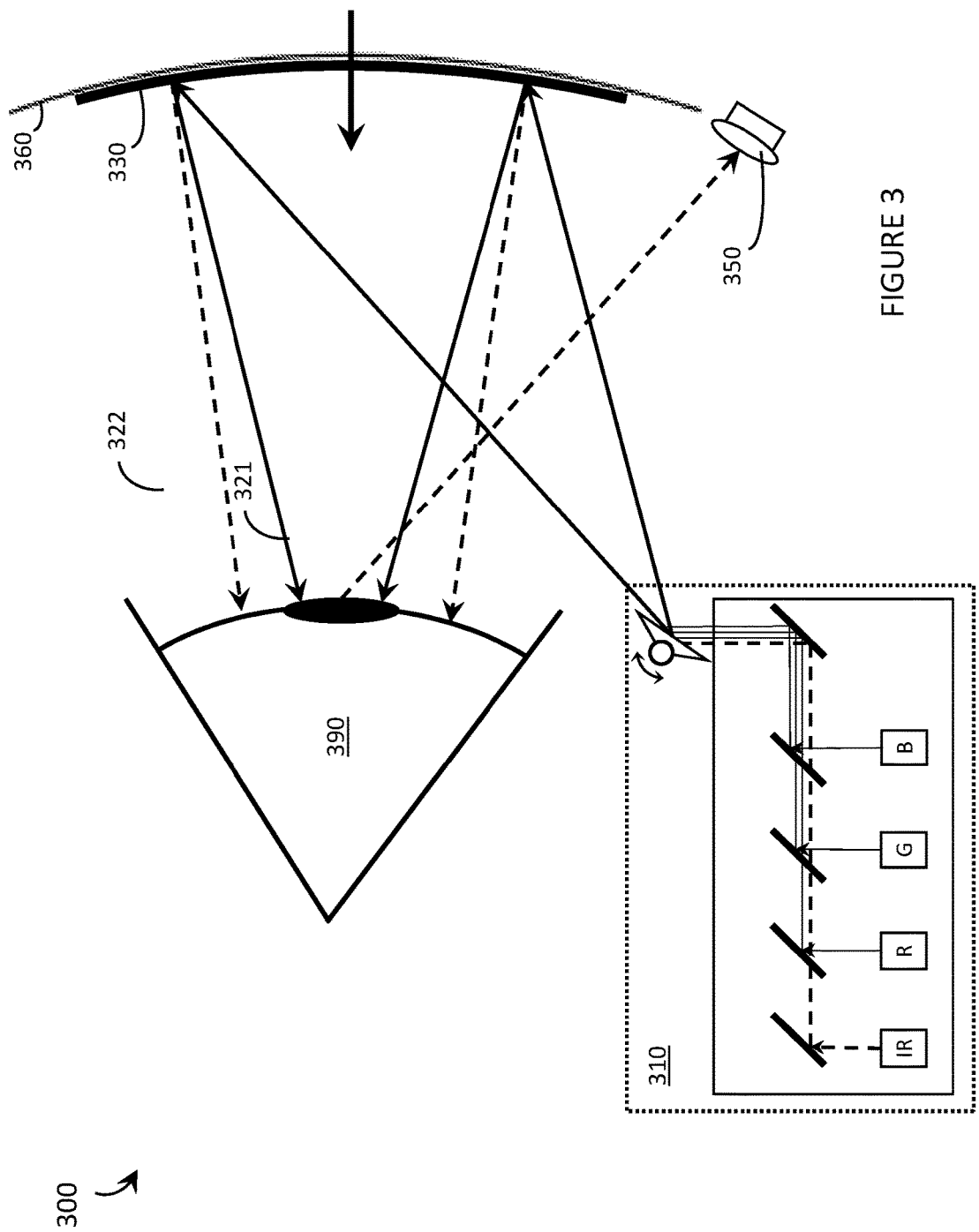
FIG. 3 is an illustrative diagram showing a side view of a wearable heads-up display that includes a multiplexed holographic optical element and is operative to perform the method of FIG. 1 in accordance with the present systems, devices, and methods.

FIG. 3 is an illustrative diagram showing a side view of a WHUD 300 that includes a wavelength-multiplexed HOE 330 that enables both image projection and eye tracking functionality in accordance with the present systems, devices, and methods. WHUD 300 is substantially similar to WHUD 200 from FIG. 2 with some details of HOE 230 enhanced for the purpose of illustration. In brief, WHUD 300 includes a SLP 310 adapted to include an infrared laser diode (labeled as "IR" in FIG. 3) for eye tracking purposes and a transparent combiner comprising a wavelength-multiplexed HOE 330 integrated with (e.g., laminated or otherwise layered upon, or cast within) an eyeglass lens 360. Integration of HOE 330 with lens 360 may include and/or employ the systems, devices, and methods described in U.S. Non-Provisional patent application Ser. No. 15/256,148 and/or U.S. Provisional Patent Application Ser. No. 62/268,892.

HOE 330 is wavelength-multiplexed to respond differently (i.e., apply a different optical power to) different wavelengths of light incident thereon. More specifically, HOE 330 is a heterogeneous HOE including at least a first hologram that applies a first optical power to light 321 having a first wavelength (e.g., at least a first visible wavelength) and a second hologram that applies a second optical power to light 322 having a second wavelength (e.g., an infrared wavelength). The second optical power is different from the first optical power and the second wavelength is different from the first wavelength. HOE 330 may include any number of layers of holographic material (e.g., photopolymer, or a silver halide compound) carrying, encoding, containing, or otherwise including any number of holograms. A single layer of holographic material may include multiple holograms and/or individual holograms may be included on or in respective individual layers of holographic material.

In the illustrated example in FIG. 3, the "light having a first wavelength" and the "light having a second wavelength" respectively correspond to visible laser light 321 and infrared laser light 322, both output by SLP 310. SLP 310 outputs visible laser light 321 (represented by solid lines in FIG. 3) for the purpose of image projection and infrared laser light 322 (represented by dashed lines in FIG. 3) for the purpose of eye tracking. As examples, the visible laser light 321 may include light having at least one wavelength (e.g., red, green, or blue; or any combination of red, green, and/or blue) in the range of about 390 nm to about 700 nm and the infrared laser light 322 may include light having at least one wavelength in the range of about 700 nm to about 10 um. Both visible laser light 321 and infrared laser light 322 are incident on wavelength-multiplexed HOE 330 and redirected thereby towards the eye 390 of a user of WHUD 300; however, because the requirements of image projection and eye tracking are different, wavelength-multiplexed HOE 330 redirects visible laser light 321 towards eye 390 in a different way from how wavelength-multiplexed HOE 330 redirects infrared laser light 322 towards eye 390. Wavelength-multiplexed HOE 330 includes i) at least a first hologram that is responsive to (i.e., redirects and applies a first optical power to) visible laser light 321 (i.e., light having at least a first wavelength in the visible spectrum) towards eye 390 and, and ii) a second hologram that is responsive to (i.e., redirects and applies a second optical power) infrared laser light 322 (i.e., light having a second wavelength in the infrared spectrum) towards eye 390. The first optical power (i.e., the optical power applied to the visible laser light 321 by at least a first hologram of wavelength-multiplexed HOE 330) has a first positive magnitude so that the at least a first hologram in wavelength-multiplexed HOE 330 causes the visible laser light 321 to converge to a first exit pupil at or near the eye 390 of the user. This convergence is advantageous to enable the user to see displayed content with a reasonable field of view. Because wavelength-multiplexed HOE 330 is integrated with lens 360, wavelength-multiplexed HOE 330 may be positioned proximate eye 390 and the first optical power may be relatively high (e.g., greater than or equal to about 40 diopters) in order to provide the necessary convergence. Concurrently, the second optical power (i.e., the optical power applied to the infrared laser light 322 by a second hologram of wavelength-multiplexed HOE 330) is less than the first optical power applied to the visible light by the at least a first hologram of wavelength-multiplexed HOE 330. In the illustrated example, the second optical power applied by the second hologram of wavelength-multiplexed HOE 330 is positive and less than the first optical power applied by the at least a first hologram of wavelength-multiplexed HOE 330 (e.g., less than about 40 diopters; enough to reduce a divergence of, collimate, or converge) such that the infrared light 322 converges to an exit pupil that has a larger diameter at eye 390 than the exit pupil of the visible light 321 and fully contains the exit pupil of the visible light 321. Alternatively, the second optical power applied by the second hologram may be zero or negative so that the second hologram of wavelength-multiplexed HOE 330 causes the infrared laser light 322 to redirect towards 390 without convergence (i.e., as from a plane mirror) or to diverge. In other words, the second optical power may be less than or equal to about 0 diopters. Providing a larger exit pupil for the infrared light 322 than the visible light 321 at eye 390 is advantageous to enable SLP 310 to illuminate the entire area of eye 390 with infrared laser light 322 for eye tracking purposes.

In accordance with the present systems, devices, and methods, the at least a first hologram in wavelength-multiplexed HOE 330 that is responsive to visible light may include any number of wavelength-multiplexed holograms, each of which may be responsive to a respective wavelength or respective range of wavelengths of visible light. For example, the at least a first hologram in wavelength-multiplexed HOE 330 that is responsive to visible light may include a red hologram that is responsive to red light provided by SLP 310, a green hologram that is responsive to green light provided by SLP 310, and/or a blue hologram that is responsive to blue light provided by SLP 310. Advantageously, each hologram that is responsive to visible light included in the at least a first hologram of wavelength-multiplexed HOE 330 may apply that same first optical power to the particular visible light to which the hologram is responsive.

The integration of eye tracking functionality in a WHUD that already employs a SLP and a holographic combiner for display purposes may, in accordance with the present systems, devices, and methods, be achieved by mostly discreetly adapting existing hardware components as opposed to adding the bulk of many new components. Specifically, i) an infrared laser diode may be added to the SLP (the infrared diode modulated independently of the visible light diode(s) in the projector), ii) an infrared hologram may be added to the holographic combiner (the infrared hologram applying a lower optical power (including zero or negative optical power) to the infrared laser light in order to cover a large eye area, in contrast to the relatively large optical power applied by the holographic combiner to the visible laser light), and iii) at least one infrared photodetector may be added to the WHUD to monitor reflections of the infrared laser light from the eye of the user.

As described previously, both the first hologram and the second hologram of wavelength-multiplexed HOE 330 may be included in or on a single layer of holographic material (e.g., film) or, alternatively, the first hologram may be included in or on a first layer of holographic material and the second hologram may be included in or on a second layer of holographic material. In the latter case, the first layer of holographic material and the second layer of holographic material may be laminated or otherwise layered together either directly or through any number of intervening layers/materials.

In some implementations, wavelength-multiplexed HOE 330 may include any number of additional holograms distributed over any number of layers. For example, wavelength-multiplexed HOE 330 may include a first hologram that is responsive to a red component of visible laser light 321, a second hologram that is responsive to infrared laser light 322, a third hologram that is responsive to a green component of visible laser light 321, and a fourth hologram that is responsive to a blue component of visible laser light 321. In this configuration, the first, third, and fourth holograms may each apply a same first optical power to the respective visible light to which each hologram is responsive and the second hologram may apply a second optical power to the infrared light.

In accordance with the present systems, devices, and methods, an eye tracking system (or an "eye tracker") may include one or more digital processor(s) communicatively coupled to the one or more infrared photodetector(s) and to one or more non-transitory processor-readable storage medium(ia) or memory(ies). The memory(ies) may store processor-executable instructions and/or data that, when executed by the processor, enable the processor to determine the position and/or motion of an eye of the user, or the gaze direction of the eye of the user, based on information (e.g., intensity information, such as an intensity pattern/map) provided by the one or more photodetector(s).

Figure 4:
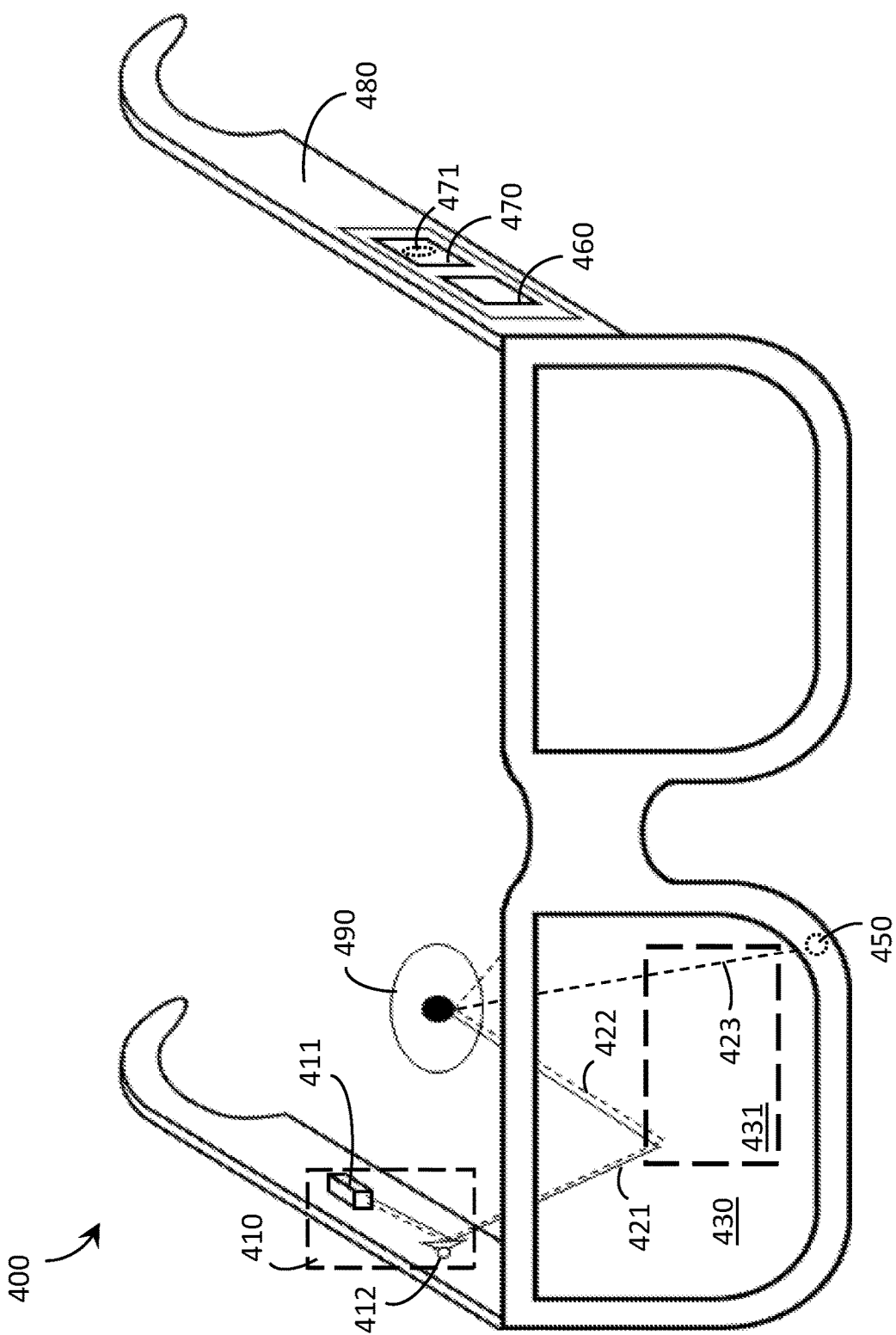
FIG. 4 is a perspective view of a wearable heads-up display that is operative to perform the method of FIG. 1 in accordance with the present systems, devices, and methods.

FIG. 4 is a perspective view of a WHUD 400 that integrates eye tracking and scanning laser projection in accordance with the present systems, devices, and methods. WHUD 400 includes many of the elements depicted in FIGS. 2 and 3, namely: a SLP 410 comprising laser module 411 with at least one visible laser diode (e.g., a red laser diode, a green laser diode, a blue laser diode, or any combination thereof) to output a visible laser light 421 (e.g., a red laser light, a green laser light, a blue laser light, or any combination thereof) and an infrared laser diode to output infrared laser light 422, at least one scan mirror aligned to receive laser light output from the laser module 411 and controllably orientable to reflect (i.e., scan) the laser light, a wavelength-multiplexed HOE 430 aligned to redirect the laser light 421 and 422 towards an eye 490 of a user, and at least one infrared photodetector 450 responsive to infrared laser light 422. Depending on the implementation, the visible laser light 421 may correspond to any of, either alone or in any combination, a red laser light, a green laser light, and/or a blue laser light. WHUD 400 also includes a support frame 480 that has a general shape and appearance or a pair of eyeglasses. Support frame 480 carries SLP 410, photodetector 450, and wavelength-multiplexed HOE 430 so that HOE 430 is positioned within a field of view of the eye 490 of the user when support frame 480 is worn on a head of the user. A stated previously, however, in some implementations other optics (such as waveguide structures and/or grating structures) may be used in place of HOE 430 to achieve similar functionality.

Support frame 480 of WHUD 400 also carries a digital processor 460 communicatively coupled to SLP 410 and photodetector 450, and a non-transitory processor-readable storage medium or memory 470 communicatively coupled to digital processor 470. Memory 470 stores data and/or processor-executable instructions 471 that, when executed by processor 460, cause WHUD 400 to perform method 100 from FIG. 1. More specifically, data and/or processor-executable instructions 471, when executed by processor 460, cause WHUD 400 to: generate an infrared laser light 422 by the infrared laser diode of SLP 410; scan the infrared laser light 422 over the eye 490 of the user (either directly or indirectly via one or more intervening optics such as an HOE or waveguide) by the at least one scan mirror 412, wherein scanning the infrared laser light 422 over the eye 490 of the user (either directly or indirectly via one or more intervening optics such as an HOE or waveguide) by the at least one scan mirror 412 includes sweeping the at least one scan mirror 412 through a range of orientations and, for a plurality of orientations of the at least one scan mirror 412, reflecting the infrared laser light 422 to a respective region of the eye 490 of the user (either directly or indirectly via one or more intervening optics such as a HOE or waveguide); detect reflections 423 of the infrared laser light 422 from the eye 490 of the user by the at least one infrared photodetector 450; determine a respective intensity of each detected reflection 423 of the infrared laser light 422 by the processor 460; identify, by the processor 460, at least one detected reflection 423 for which the intensity exceeds a threshold value; determine, by the processor 460, the orientation of the at least one scan mirror 412 that corresponds to the at least one detected reflection 423 for which the intensity exceeds the threshold value; and determine, by the processor 460, a region in a field of view of the eye 490 of the user at which a gaze of the eye 490 is directed based on the orientation of the at least one scan mirror 412 that corresponds to the at least one detected reflection 423 for which the intensity exceeds the threshold value. Together, all of these acts enable WHUD 400 to determine a gaze direction of eye 490.

Since, in addition to eye tracking/gaze direction detection capability, WHUD 400 also has a display capability, memory 470 further stores data and/or processor-executable instructions that, when executed by processor 460 WHUD 400 to project visible display content 431 in the field of view of the eye 490 of the user by SLP 410 (in conjunction with HOE 430). In this case, data and/or processor-executable instructions 471, when executed by processor 460, may cause WHUD 400 to determine, by the processor 460, a region in a field of view of the eye 490 of the user at which a gaze of the eye 490 is directed based on the orientation of the at least one scan mirror 412 that corresponds to the at least one detected reflection 423 for which the intensity exceeds the threshold value, by causing WHUD 400 to determine, by the processor 460, a region of the visible display content 431 at which the gaze of the eye 490 is directed based on the orientation of the at least one scan mirror 412 that corresponds to the at least one detected reflection 423 for which the intensity exceeds the threshold value.

As previously described, infrared photodetector 450 may advantageously be positioned on support frame 480 at a periphery of the field of view of the eye 490 of the user when the eye 490 is gazing straight ahead (e.g., on the rims of frame 480 that surround the eyeglass lens that carries HOE 430). In this case, the data and/or processor-executable instructions that, when executed by the processor 460, cause WHUD 400 to project visible display content 431 in the field of view of the eye 490 of the user by the SLP 410, may advantageously cause the SLP 410 to position the visible display content 431 away-from-center in the field of view of the eye 490 of the user and towards the position of the at least one infrared photodetector 450 at the periphery of the field of view of the eye 490 of the user, as depicted in the exemplary implementation of FIG. 4.

Throughout this specification, FIGS. 2, 3, and 4, as well as the appended claims, reference is often made to the eye of the user. For example, FIG. 2 depicts eye 290, FIG. 3 depicts eye 390, and FIG. 4 depicts eye 490. In general, the systems, devices, and methods described herein are suitable for use in association with at least one eye of a user (e.g., 290, 390, or 490) but do not themselves include the eye of the user. In other words, eye 290 is not a part of WHUD 200, eye 390 is not a part of WHUD 300, and eye 490 is not a part of WHUD 400.

The various embodiments described herein generally reference and illustrate a single eye of a user (i.e., monocular applications), but a person of skill in the art will readily appreciate that the present systems, devices, and methods may be duplicated in a WHUD in order to provide scanned laser projection and scanned laser eye tracking for both eyes of the user (i.e., binocular applications).

The various embodiments described herein measure, sense, detect, identify, or otherwise determine the intensity of detected infrared reflections and use this information to identify when the intensity of a detected infrared reflection exceeds a threshold value. The threshold value may be a certain percentage above a baseline detection value, such as 10% above, 50% above, 100% above, 500% above, 1000% above, or so on depending on the specific implementation. A detected infrared reflection that exceeds the threshold value is used herein because such generally corresponds to a spectral reflection for the eye of the user known as the first Purkinje image or glint. The glint provides a useful, reliable, and sufficient detection feature for the purpose of determining the gaze direction of the eye of the user; thus, in method 100 only detected reflections that correspond to glints are used to determine the gaze direction of the eye of the user. However, the entire collection of detected reflections of the infrared laser light from the eye of the user can be useful in other applications. For example, acts 101, 102, 103, and 104 may be employed to produce a complete (depending on the resolution given, at least in part, by the step size between orientations of the at least one scan mirror) infrared image of the eye of the user. This infrared image may be used for more detailed (and more computational intensive) eye tracking and gaze detection purposes, or for other purposes such as user authentication via iris or retinal blood vessel recognition, or pupil/iris size detection that may be used to infer information about the user's environment such as ambient light brightness levels. That is, conventional techniques and algorithms for iris recognition and/or retinal blood vessel recognition (which typically use visible light and color photography or videography) may be adapted to employ scanned infrared laser light and infrared images of the eye of the user generated by performing acts 101, 102, 103, and 104 of method 100 (together with further acts of data processing to produce an infrared image and image processing to achieve recognition).

The various embodiments of eye tracking systems and devices described herein may, in some implementations, make use of additional or alternative "Purkinje images" (i.e., other than the "glint") and/or may employ the "corneal shadow based" methods of eye tracking described in U.S. Non-Provisional patent application Ser. No. 15/331,204.

The WHUDs described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/167,458, U.S. Non-Provisional patent application Ser. No. 15/167,472, U.S. Non-Provisional patent application Ser. No. 15/167,484, U.S. Non-Provisional patent application Ser. No. 15/256,148, U.S. Provisional Patent Application Ser. No. 62/268,892, and U.S. Non-Provisional patent application Ser. No. 15/331,204, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of determining a gaze direction of an eye of a user, the method comprising:
   generating an infrared laser light by an infrared laser diode;
   scanning the infrared laser light over the eye of the user by at least one scan mirror, wherein scanning the infrared laser light over the eye of the user by the at least one scan mirror includes sweeping the at least one scan mirror through a range of orientations and, for a plurality of orientations of the at least one scan mirror, reflecting the infrared laser light to a respective region of the eye of the user;
   detecting reflections of the infrared laser light from the eye of the user by at least one infrared photodetector;
   determining a respective intensity of a plurality of detected reflections of the infrared laser light by at least one processor communicatively coupled to the at least one infrared photodetector;
   identifying, by the at least one processor, at least one detected reflection for which the intensity exceeds a threshold value;
   determining, by the at least one processor, the orientation of the at least one scan mirror that corresponds to the at least one detected reflection for which the intensity exceeds the threshold value; and
   determining, by the at least one processor, a region in a field of view of the eye of the user at which a gaze of the eye is directed based on the orientation of the at least one scan mirror that corresponds to the at least one detected reflection for which the intensity exceeds the threshold value.

2. The method of claim 1 wherein scanning the infrared laser light over the eye of the user by at least one scan mirror includes scanning, by the at least one scan mirror, the infrared laser light over an area of a holographic optical element positioned in the field of view of the eye of the user and redirecting the infrared laser light towards the eye of the user by the holographic optical element.

3. The method of claim 2 wherein redirecting the infrared laser light towards the eye of the user by the holographic optical element includes converging the infrared laser light to an exit pupil at the eye of the user by the holographic optical element.

4. The method of claim 1 wherein scanning the infrared laser light over the eye of the user by at least one scan mirror includes scanning the infrared laser light across a first dimension of the eye of the user by a first scan mirror and scanning the infrared laser light across a second dimension of the eye of the user by a second scan mirror, and wherein:
   sweeping the at least one scan mirror through a range of orientations includes sweeping the first scan mirror through a first range of orientations and, for each respective orientation of the first scan mirror, sweeping the second scan mirror through a second range of orientations;
   for a plurality of orientations of the at least one scan mirror, reflecting the infrared laser light to a respective region of the eye of the user includes, for a plurality of combinations of a first orientation of the first scan mirror and a second orientation of the second scan mirror, reflecting the infrared laser light to a respective region of the eye of the user;
   determining, by the at least one processor, the orientation of the at least one scan mirror that corresponds to the at least one detected reflection for which the intensity exceeds the threshold value includes determining, by the at least one processor, the combination of the first orientation of the first scan mirror and the second orientation of the second scan mirror that corresponds to the at least one detected reflection for which the intensity exceeds the threshold value; and
   determining, by the at least one processor, a region in a field of view of the eye of the user at which a gaze of the eye is directed based on the orientation of the at least one scan mirror that corresponds to the at least one detected reflection for which the intensity exceeds the threshold value includes determining, by the at least one processor, the region in the field of view of the eye of the user at which the gaze of the eye is directed based on the combination of the first orientation of the first scan mirror and the second orientation of the second scan mirror that corresponds to the at least one detected reflection for which the intensity exceeds the threshold value.

5. The method of claim 1 wherein identifying, by the at least one processor, at least one detected reflection for which the intensity exceeds a threshold value includes detecting, by the infrared photodetector, a spectral reflection of the infrared laser light from the eye of the user.

6. The method of claim 1 wherein identifying, by the at least one processor, at least one detected reflection for which the intensity exceeds a threshold value includes sampling, by the processor, a signal from the infrared photodetector and identifying, by the processor, a first sample for which the magnitude exceeds a threshold magnitude.

7. The method of claim 6 wherein identifying, by the at least one processor, at least one detected reflection for which the intensity exceeds a threshold value further includes identifying, by the at least one processor, a second sample for which the magnitude does not exceed the threshold magnitude.

8. The method of claim 1 wherein determining, by the at least one processor, a region in a field of view of the eye of the user at which a gaze of the eye is directed based on the orientation of the at least one scan mirror that corresponds to the at least one detected reflection for which the intensity exceeds the threshold value includes effecting, by the at least one processor, a mapping between the orientation of the at least one scan mirror that corresponds to the at least one detected reflection for which the intensity exceeds the threshold value and the field of view of the eye of the user.

9. The method of claim 8 wherein effecting, by the at least one processor, a mapping between the orientation of the at least one scan mirror that corresponds to the at least one detected reflection for which the intensity exceeds the threshold value and the field of view of the eye of the user includes performing, by the at least one processor, at least one transformation selected from a group consisting of: a linear transformation between a set of scan mirror orientations and a set of gaze directions of the eye of the user, a geometric transformation between a set of scan mirror orientations and a set of gaze directions of the eye of the user, an affine transformation between a set of the scan mirror orientations and a set of gaze directions of the eye of the user, and a neural network transformation between a set of scan mirror orientations and a set of gaze directions of the eye of the user.

10. The method of claim 1 wherein the infrared laser diode and the at least scan mirror are components of a scanning laser projector, the scanning laser projector further including at least one additional laser diode to generate visible laser light, and wherein the method further comprises:

projecting visible display content in the field of view of the eye of the user by the scanning laser projector, wherein determining, by the at least one processor, a region in a field of view of the eye of the user at which a gaze of the eye is directed based on the orientation of the at least one scan mirror that corresponds to the at least one detected reflection for which the intensity exceeds the threshold value includes determining, by the at least one processor, a region of the visible display content at which the gaze of the eye is directed based on the orientation of the at least one scan mirror that corresponds to the at least one detected reflection for which the intensity exceeds the threshold value.

11. The method of claim 10 wherein determining, by the at least one processor, a region of the visible display content at which the gaze of the eye is directed based on the orientation of the at least one scan mirror that corresponds to the at least one detected reflection for which the intensity exceeds the threshold value includes performing, by the at least one processor, at least one transformation selected from a group consisting of: a linear transformation between a set of scan mirror orientations and a set of regions of the visible display content, a geometric transformation between a set of scan mirror orientations and a set of regions of the visible display content, an affine transformation between a set of the scan mirror orientations and a set of regions of the visible display content, and a neural network transformation between a set of scan mirror orientations and a set of regions of the visible display content.

12. The method of claim 10 wherein the at least one infrared photodetector is positioned at a first position at a periphery of the field of view of the eye of the user when the eye is gazing straight ahead, and wherein projecting visible display content in the field of view of the eye of the user by the scanning laser projector includes positioning, by the scanning laser projector, the visible display content away-from-center in the field of view of the eye of the user and towards the position of the at least one infrared photodetector at the periphery of the field of view of the eye of the user.

* * * * *